United States Patent [19]
Nishihara

[11] Patent Number: 5,200,087
[45] Date of Patent: Apr. 6, 1993

[54] METHOD OF AND APPARATUS FOR RECOVERING MERCURY FROM DRAINAGE

[75] Inventor: Mitsuyuki Nishihara, Kyoto, Japan

[73] Assignee: Kubota Corporation, Osaka, Japan

[21] Appl. No.: 803,591

[22] Filed: Dec. 9, 1991

[30] Foreign Application Priority Data

Dec. 12, 1990 [JP] Japan ................ 2-401734

[51] Int. Cl.$^5$ .............................. C02F 1/62; C02F 1/70
[52] U.S. Cl. ....................................... 210/718; 210/719;
210/750; 210/757; 210/180; 210/188; 210/218;
210/914
[58] Field of Search ............... 210/718, 719, 750, 752,
210/757, 914, 180, 188, 199, 218, 220, 201, 258

[56] References Cited

U.S. PATENT DOCUMENTS

| | | | |
|---|---|---|---|
| 3,463,635 | 8/1969 | Rhodes et al. | 75/121 |
| 3,857,704 | 12/1974 | Conlter | 210/719 |
| 4,566,975 | 1/1986 | Allgnlin | 210/914 |
| 4,599,177 | 7/1986 | Hayashi et al. | 210/914 |
| 5,098,579 | 3/1992 | Leigh et al. | 210/914 |
| 5,122,279 | 6/1992 | Gross | 210/757 |

FOREIGN PATENT DOCUMENTS

| | | |
|---|---|---|
| 97478 | 1/1984 | European Pat. Off. |
| 1805332 | 4/1976 | Fed. Rep. of Germany |
| 3721141 | 1/1989 | Fed. Rep. of Germany |
| 3812501 | 7/1989 | Fed. Rep. of Germany |
| 4738709 | 10/1968 | Japan |
| 5085572 | 12/1973 | Japan |
| 60-183088 | 9/1985 | Japan |
| 60-183091 | 9/1985 | Japan |

Primary Examiner—Stanley S. Silverman
Assistant Examiner—Christopher Upton
Attorney, Agent, or Firm—Webb, Burden, Ziesenheim & Webb

[57] ABSTRACT

In a method of and apparatus for recovering mercury from drainage, mercury-containing waste water is fed into a first treating tank where the waste water is heated together with a metal having a stronger ionizing tendency than mercury, to reduce mercury ions in the waste water and free the mercury ions as metallic mercury. The solution under treatment is then transferred to a second treating tank where the solution is alkalinized, and mercury ions remaining in the solution is reduced by means of a water soluble metallic salt having a stronger ionizing tendency than mercury, to free the mercury ions as metallic mercury. Mercury vapor containing gases generating from the first and second treating tanks are cooled in a cooling device, and condensed and liquefied mercury is collected in a gas-liquid separator. Exhaust gas generating from the gas-liquid separator is fed into the solution under treatment in the second treating tank.

11 Claims, 1 Drawing Sheet

METHOD OF AND APPARATUS FOR RECOVERING MERCURY FROM DRAINAGE

BACKGROUND OF THE INVENTION

1. Field of the Invention

The present invention relates to recovery of mercury from drainage, and more particularly to mercury recovery from waste water having been used in cleaning exhaust gas from an incinerator, for example.

2. Description of the Related Art

When waster matters burned in an incinerator include mercury-containing products such as dry cells, fluorescent lamps, thermometers and the like, the incinerator lets out exhaust gas containing noxious mercury vapor. Thus, when the waste gas from the incinerator is treated with cleaning water, mercury is mixed into the cleaning water. To prevent environmental pollution, it is necessary to remove mercury from such mercury-containing waste water. The recovered mercury may be reclaimed for use as a resource. Mercury is dissolved in such waste water in the forms of mercury chloride, mercury oxide and the like.

In a conventional method of recovering mercury from waste water after cleaning such exhaust gas, the mercury-containing waste water is heated and aerated in a treating tank, thereby vaporizing mercury in the waste water into mercury vapor. Subsequently, the mercury vapor is cooled to become liquid mercury which is collected by a gas-liquid separator. Exhaust gas resulting from the gas-liquid separation contains liquid vapor in a quantity corresponding to saturated vapor pressure. To recover the residual mercury, the exhaust gas after the gas-liquid separation is fed back to the waste water in the heating tank.

In another known method which is an improvement upon the above method, metallic tin (Sn) is fed into a treating tank as a reducing agent to reduce mercury ions in waste water to metallic mercury. The rest of the process is the same as the above method, by which the metallic mercury is vaporized and released in vapor state from the treating tank, to be cooled into liquid mercury which is recovered through a gas-liquid separator. In yet another known method, waste water is alkalinized in a treating tank and stannous chloride ($SnCl_2$) is applied thereto as a reducing agent. Subsequently, mercury is recovered as in the foregoing methods.

However, these known methods of recovering mercury have the following disadvantages which remain to be overcome.

Generally, exhaust gas from an incinerator contains hydrogen chloride (HCl), sulfur dioxide ($SO_2$) and other substances. Waste water after cleaning such exhaust gas is acidic with hydrogen chloride, sulfur dioxide and other substances dissolved therein. However, mercury and its compounds, whether in gaseous state or solid state, have a property readily soluble in an acidic solution. Unseparated mercury vapor fed from a gas-liquid separator into such waste water will readily be dissolved back in the water. Once mercury vapor is redissolved, it is difficult to remove mercury from the waste water.

There is an additional problem that the treating tank and piping are corroded by the acidic waste water resulting from gas cleaning. It is therefore necessary to neutralize the exhaust liquid after recovery of mercury.

On the other hand, it is difficult to reduce mercury chloride and remove it from a weakly acidic solution.

Further, tin has a weak reducing effect unless turned into a very strong acid. Consequently, mercury recovery in weakly acidic regions requires a long gas-liquid contact time.

The treating time may be shortened by turning waste water into a strong acid for reduction purposes. However, this would increase the chance of the treating tank and piping becoming corroded, and aggravate the problem of treating waste liquid after the mercury recovery.

If, on the other hand, the above methods are executed by alkalinizing the waste water, it will be difficult for mercury vapor to redissolve in the waste water. In addition, although tin becomes sulfur dioxide ions in the solution and shows a strong reducing power, mercury oxide and other mercury compounds are not readily soluble in an alkaline solution but tend to form deposits. Once mercury compounds are deposited, the reducing reaction tends to be retarded, making it difficult to reduce all the mercury compounds sufficiently.

SUMMARY OF THE INVENTION

The object of the present invention is to provide an efficient method of and apparatus for recovering mercury from drainage, which overcome the disadvantages of the prior art noted above.

The above object is fulfilled, according to the present invention, by a method comprising the steps of feeding mercury-containing waste water into a first treating tank; heating the waste water in the first treating tank together with a metal having a stronger ionizing tendency than mercury, to reduce mercury ions in the waste water and free the mercury ions as metallic mercury; transferring the solution under treatment from the first treating tank to a second treating tank; adjusting the solution to be alkaline in the second treating tank, and reducing the mercury ions remaining in the solution under treatment by means of a water soluble metallic salt having a stronger ionizing tendency than mercury, to free the mercury ions as metallic mercury; cooling mercury vapor containing gases generating from the first treating tank and the second treating tank; collecting, in a gas-liquid separator, mercury having been condensed and liquefied as a result of the cooling step; and feeding exhaust gas generating from the gas-liquid separator into the solution under treatment in the second treating tank.

In a further aspect of the invention, an apparatus is provided for recovering mercury from drainage, which comprises a first treating tank including a waste water inlet and an aerating device for reducing mercury ions in waste water with a metal having a stronger ionizing tendency than mercury; a second treating tank including an aerating device for reducing residual mercury ions in the solution having undergone the reducing reaction in the first treating tank, with a water soluble metallic salt having a stronger ionizing tendency than mercury; a connecting passage for supplying the solution under treatment from the first treating tank to the second treating tank; a withdrawal path for withdrawing mercury vapor from the first treating tank and the second treating tank, and delivering the mercury vapor to a cooling device; a gas-liquid separator for separating, from gases, mercury condensed into liquid form by the cooling device; and a gas supplying device for supplying exhaust gas from the gas-liquid separator to the aerating device mounted in the second treating tank.

The mercury recovering method and apparatus according to the present invention have the following functions and effects.

Acidic mercury-containing waste water such as exhaust gas cleaning water drained from an incinerator is heated in the first treating tank together with a metal having a stronger ionizing tendency than mercury (hereinafter referred to as a mercury reducing metal). As a result, mercury ions in the waste water are reduced by the mercury reducing metal, and freed as metallic mercury. The metallic mercury is vaporized to become mercury vapor and move to a gaseous phase section in the tank. Aeration in the first treating tank will produce an agitating effect to promote contact between the mercury ions and mercury reducing metal, and an effect of promoting escape of mercury vapor to the gaseous phase section, thereby expediting removal of the mercury ions from the waste water. The heating or aeration may be carried out using vapor generated by utilizing waste heat of the incinerator. The reducing reaction progresses in acidic state in the first treating tank, whereby mercury compounds such as mercury oxide are effectively reduced to mercury vapor. However, mercury chloride will remain in the solution without being reduced sufficiently.

The liquid having undergone the treatment in the first treating tank is transferred to the second treating tank. In the second treating tank, the mercury ions remaining in the solution under treatment are reduced by a water soluble metallic salt having a stronger ionizing tendency than mercury (hereinafter referred to as a mercury reducing salt). Consequently, the mercury ions are freed as metallic mercury which is vaporized to become mercury vapor and move to a gaseous phase section. Aeration in the second treating tank will produce an agitating effect to promote contact between the mercury ions and mercury reducing salt, and an effect of promoting escape of mercury vapor to the gaseous phase section, thereby expediting removal of the mercury ions from the solution. The apparatus may be simplified by using, for aeration purposes, exhaust gas from the gas-liquid separator as described hereunder.

The reducing reaction progresses in alkaline state in the second treating tank, whereby the mercury compounds not sufficiently reduced in the first treating tank are reduced to mercury vapor.

The gases (mainly air in an ordinary situation) containing mercury vapor in the gaseous phase sections of the first and second treating tanks are cooled in the cooling device. As a result, almost all of the mercury vapor is condensed into liquid. The liquefied mercury is separated from the gases and collected in the gas-liquid separator for use as a reclaimed product.

Mercury vapor still remains in exhaust gas from the gas-liquid separator. This exhaust gas is fed by the gas supplying device such as a blower into the solution under treatment in the second treating tank. Mercury vapor is readily soluble in an acidic solution and not in an alkaline solution. The solution under treatment in the second treating tank is alkaline. Consequently, the mercury vapor contained in the exhaust gas is led again, without being redissolved, to the gaseous section in the second treating tank along with mercury vapor newly generating from the solution under treatment. The mercury vapor is then transferred to the cooling device where most part of the mercury vapor is condensed to liquid. By continuing this recirculation, substantially the entire quantity of mercury is removed and recovered from the solution.

Thus, mercury in the waste water, whether the simple substance or in compound forms such as mercury chloride and mercury oxide, is recovered efficiently and reliably to prevent pollution.

Moreover, the reducing operation is effected by using not only stannous chloride but an inexpensive substance such as metallic tin, which has the advantage of reducing running cost of the mercury recovering apparatus.

The apparatus may employ an acid resistant material only in portions that directly contact the acidic aqueous solution. The other portions are free from corrosion by acid.

The apparatus releases non-acidic drainage which is easy to treat.

Other features and advantages of the present invention will be apparent from the dependent claims and the description of the preferred embodiments to be had with reference to the drawings.

DETAILED DESCRIPTION OF THE PREFERRED EMBODIMENTS

Methods of and apparatus for recovering mercury from drainage according to the present invention will be described in detail with reference to the drawings.

Figure 1:
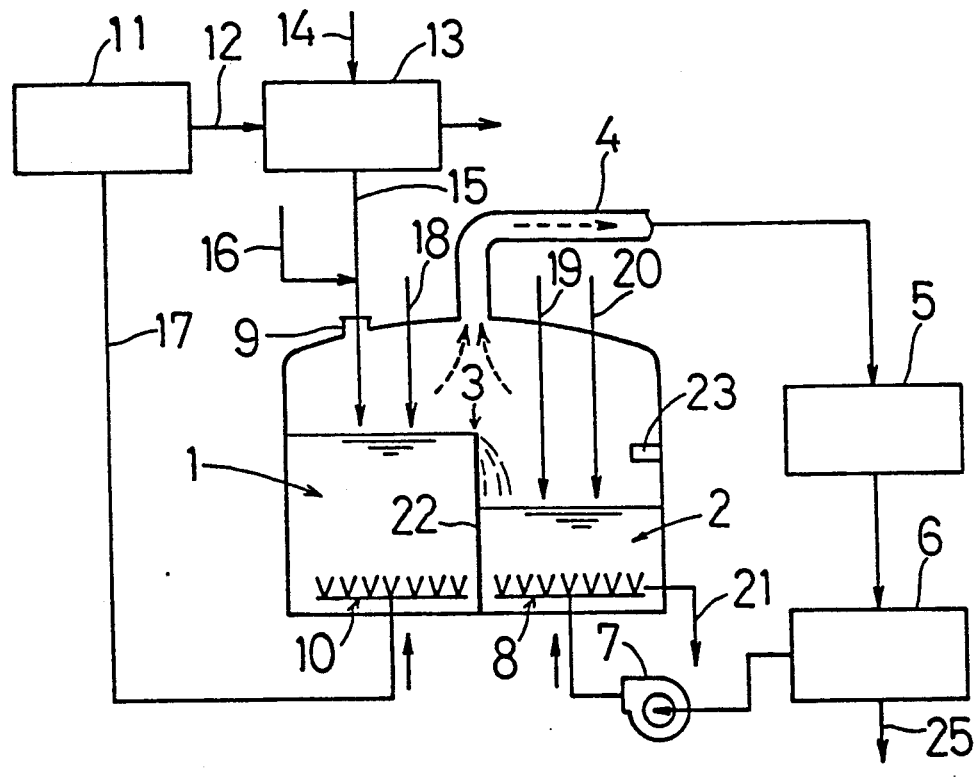
FIG. 1 is a schematic view showing an embodiment of the present invention.

FIG. 1 shows the invention as applied for treating waste water that has been used in cleaning exhaust gas from an incinerator. In this embodiment, one closed vessel is divided by a partition 22 into two liquid storage compartments intercommunicating at the top. The liquid storage compartments act as a first treating tank 1 and a second treating tank 2, respectively, which communicate with each other through a connecting passage 3. The illustrated apparatus is simple in construction, easy to manufacture, and easy to maintain.

Both the first treating tank 1 and second treating tank 2 are connected through a withdrawal path 4 to a cooling device 5. The cooling device 5 is connected to a gas-liquid separator 6. The gas-liquid separator 6 has an exhaust gas outlet connected through a gas supplying device 7 to an aerating device 8 mounted in the second treating tank 2. The first treating tank 1 includes a mercury-containing waste water inlet 9, and an aerating device 10 which acts also as a heater.

Although the illustrated embodiment includes one each of the first treating tank, second treating tank, connecting passage, withdrawal path, cooling device, gas-liquid separator and gas supplying device, a plurality of each of these devices may be provided. For example, a plurality of withdrawal paths and a plurality of cooling devices may be provided to constitute totally separate systems for connection to the first treating tank 1 and second treating tank 2.

An incinerator 11 transmits exhaust gas 12 to a gas cleaner 13 where the exhaust gas is cooled and cleaned by a cleaning water 14 prior to release to the ambient. Acidic mercury-containing waste water 15 is fed from the gas cleaner 13 into the first treating tank 1 through the waste water inlet 9. An acid (or alkali) 16 may be added to the waste water 15 for pH adjustment, as necessary. Where, for example, tin is used as a mercury reducing metal, the acid 16 may be added to the acidic mercury-containing waste water 15 having a pH value of 6 to 6.5, to adjust the pH value of the water in the first treating tank 1 to be 5 to 6. The acid (or alkali) 16 may be added to the acidic mercury-containing waste water 15 prior to delivery to the first treating tank 1 as illustrated, or may be added to the acidic mercury-containing waste water 15 already inside the first treating tank 1.

Further, a mercury reducing metal 18 is fed into the first treating tank 1 to reduce mercury ions in the waste water. Whichever of the mercury-containing waste water 15 and mercury reducing metal 18 may be fed into the first treating tank 1 before the other, or they may be fed simultaneously. The feeding mode may be continuous or in batches.

The mercury reducing metal 18 may be tin, iron or zinc, for example. These substances are not limitative, but the metal 18 may suitably be selected from metals having strong ionizing tendencies.

Vapor 17 (e.g. at 200° C. to 230° C.) is generated by utilizing waste heat of the incinerator 11. The vapor 17 is supplied to the aerating device 10 acting also as a heater to aerate and heat the waste water in the first treating tank 1. A separate heater may be provided instead of having the aerating device 10 acting also as a heater, and it is not absolutely necessary to use the vapor. An aerating device and a heater may suitably be selected from conventional devices.

A large part of the mercury contained in the waste water becomes mercury vapor in the first treating tank 1. This mercury vapor is transmitted through the withdrawal path 4 to the cooling device 5 to be liquefied therein. The resulting liquid mercury is collected in the gas-liquid separator 6. Exhaust gas from the gas-liquid separator 6 is led through the gas supplying device 7 to the aerating device 8 mounted in the second treating tank 2. The gas supplying device 7 may be a blower, compressor or any other device that can drive the gas. The gas supplying device 7 need not be in the location shown in FIG. 1, but may be disposed in an intermediate position along the withdrawal path 4, for example. The cooling device 5, gas-liquid separator 6 and aerating device 8 may be selected from conventional devices.

An alkaline substance 19 is added to the solution under treatment which has flowed into the second treating tank 2, thereby to alkalinize the solution. For this purpose, the alkaline substance may be supplied into the second treating tank 2 in advance, or may be supplied continuously or in batches into the second treating tank 2 after the solution under treatment is transferred to the second treating tank 2. The alkaline substance is not limited to any particular substance, but may be selected from known substances such as sodium hydroxide and potassium hydroxide. This substance may be in solid form, liquid form or gaseous form.

A mercury reducing salt 20 is supplied continuously or in batches into the second treating tank 2, to cause reducing reaction of mercury ions in the solution under treatment.

The mercury reducing salt 20 may be supplied into the second treating tank 2 before or after or simultaneously with transfer of the solution from the first treating tank 1 to the second treating tank 2. The mercury reducing salt 20 may be supplied in solid form or in a solution.

The mercury reducing salt 20 may be stannous chloride ($SnCl_2$), ferrous chloride ($FeCl_2$), ferrous nitride ($Fe(NO_3)_2$) or stannous sulfate ($SnSO_4$), for example. However, these substances are not limitative, but the mercury reducing salt may be any substance that is water soluble and capable of reducing mercury ions.

In the second treating tank 2, mercury contained in the solution changes into mercury vapor. This mercury vapor is transmitted through the withdrawal path 4 to the cooling device 5 to be liquefied therein. The resulting liquid mercury is collected in the gas-liquid separator 6. The exhaust gas from the gas-liquid separator 6 is led through the gas supplying device 7 to the aerating device 8, whereby the exhaust gas is fed into the solution under treatment to aerate the solution. Through this recirculation, almost all the mercury in the solution is collected in the gas-liquid separator 6, and output from the illustrated apparatus as liquid mercury 25.

In the reducing reaction, mercury recovery is expedited when the treated solution is at a temperature, e.g. about 80° C., higher than room temperature. If the treated solution is at such a high temperature as a result of heating in the first treating tank 1, the second treating tank 2 requires no heater to be mounted therein.

When releasing drainage 21 stripped of mercury in the second treating tank 2, an additional drainage treatment (e.g. alkali neutralization) may be carried out as necessary.

When the level of the solution treated in the second treating tank 2 reaches an upper end of the partition 22, there will occur the inconvenience of the alkaline solution flowing from the second treating tank 2 back to the first treating tank 1. To avoid this inconvenience, a level gauge 23 may be mounted in the second treating tank 2 to monitor the liquid level for constantly maintaining the level below the upper end of the partition 22.

It has been found through repeated experiment that, of the total quantity of mercury (simple substance and compounds) contained in the waste water, about 60% by weight is removed from the solution in the first treating tank 1, and 95 to 99% of the mercury remaining in the solution is removed therefrom in the second treating tank 2. As a whole, 98 to 99% by weight of mercury is removed and recovered from waste water.

Figure 2:
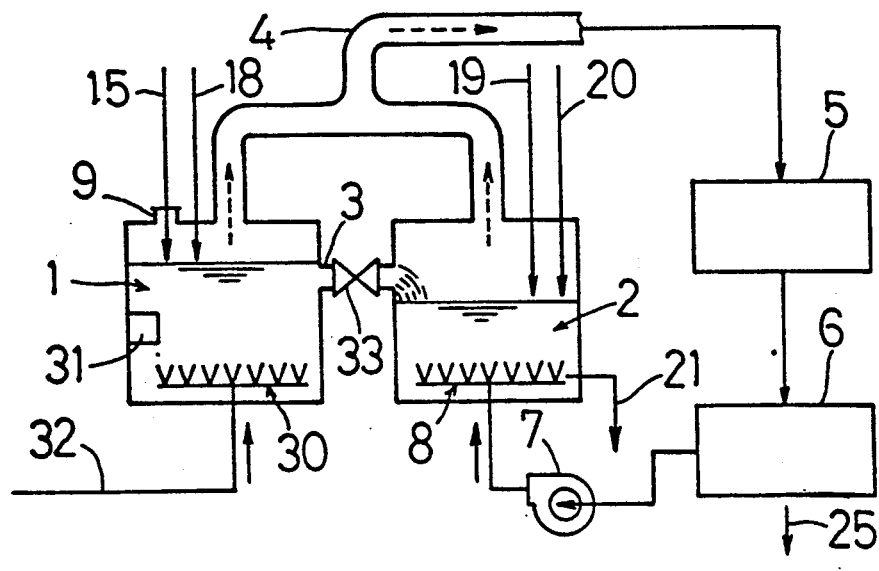
FIG. 2 is a schematic view of a different embodiment of the present invention.

FIG. 2 shows a different embodiment of the present invention. In FIG. 2, like references are used to identify like parts or components with respect to FIG. 1. This embodiment is the same as the preceding embodiment in the aspects not specifically described hereinafter.

In the embodiment shown in FIG. 2, the first treating tank 1 and second treating tank 2 are separate vessels interconnected through a pipe acting as the connecting passage 3. The connecting passage 3 includes a valve 33 to facilitate control of flow rate of the treated solution flowing into the second treating tank 2 and control of treating time in the first treating tank 1. The first treating tank 1 and second treating tank 2 have pipes extending therefrom, respectively, and joining together to become the withdrawal path 4 reaching the cooling device 5. The first treating tank 1 has an aerating device 30 and a heater 31 separately mounted therein. The aerating device 30 aerates the solution under treatment with aerating air 32 instead of vapor.

Acidic mercury-containing waste water 15 drained from an industrial plant or the like is fed into the first treating tank 1 through the waste water inlet 9. In the first treating tank 1, mercury contained in the waste water is reduced by the mercury reducing metal 18 while the water is aerated by the aerating device 30 and heated by the heater 31.

The solution under treatment may be transferred continuously or in batches from the first treating tank 1 to the second treating tank 2.

For alkalinizing the solution under treatment in the second treating tank 2, the alkaline substance 19 may be added to the solution flowing from the first treating tank 1 to the second treating tank 2, or may be supplied into the second treating tank 2 in advance. The alkaline substance 19 may be supplied continuously or in batches into the second treating tank 2 after the solution is transferred to the second treating tank 2. The mercury reducing salt 20 is added to the solution under treatment in the same way as in the preceding embodiment.

Experiment has proved that, in this embodiment also, 98 to 99% by weight of mercury is removed and recovered from the waste water.

What is claimed is:

1. A method of recovering mercury from drainage comprising the steps of:

feeding mercury-containing waste water into a first treating tank;

heating the waste water in said first treating tank together with a metal having a stronger ionizing tendency than mercury, to reduce mercury ions in the waste water and free the mercury ions as metallic mercury;

transferring the solution under treatment from said first treating tank to a second treating tank;

adjusting the solution to be alkaline in said second treating tank, and reducing the mercury ions remaining in the solution under treatment by means of a water soluble metallic salt having a stronger ionizing tendency than mercury, to free the mercury ions as metallic mercury;

collecting and cooling mercury vapor containing gases generated from said first treating tank and said second treating tank:

collecting, in a gas-liquid separator, mercury having been condensed and liquefied as a result of the cooling step; and feeding exhaust gas generated from said gas-liquid separator into the solution under treatment in said second treating tank.

2. A method as claimed in claim 1, wherein said mercury-containing waste water is exhaust gas cleaning water drained from an incinerator.

3. A method as claimed in claim 2, wherein the waste water is heated and aerated in said first treating tank by means of vapor generated by utilizing waste heat of said incinerator.

4. A method as claimed in claim 3, wherein a pH adjusting acid or alkali is applied to said first treating tank.

5. An apparatus for recovering mercury from drainage comprising:

a first treating tank including an inlet means for waste water from a source of mercury containing wastewater, aerating means and means for reducing mercury ions in waste water by reacting said waste water with a metal having a stronger ionizing tendency than mercury:

a second treating tank including aerating means and means for reducing residual mercury ions in the waste water having undergone the reducing reaction in said first treating tank, by reacting said waste water under alkaline conditions with a water soluble metallic salt having a stronger ionizing tendency than mercury;

a connecting passage for supplying said waste water under treatment from said first treating tank to said second treating tank;

a withdrawal path means for withdrawing mercury vapor from said first treating tank and said second treating tank, and delivering the mercury vapor to cooling means;

gas-liquid separating means for separating, from gases, mercury condensed into liquid form by said cooling means; and gas supply means for supplying exhaust gas from said gas-liquid separating means to said aerating means mounted in said second treating tank.

6. An apparatus as claimed in claim 5, wherein said source of mercury-containing waste water is exhaust gas cleaning water drained from an incinerator.

7. An apparatus as claimed in claim 6, wherein said aerating means of said first treating tank further comprises heating means utilizing waste heat from said incinerator.

8. An apparatus as claimed in claim 7, wherein said first treating tank and said second treating tank are defined by a single vessel divided by a partition, said connecting passage being formed above said partition.

9. An apparatus as claimed in claim 8, wherein said second treating tank further includes a level gauge for monitoring liquid levels in said second treating tank.

10. An apparatus as claimed in claim 6, wherein said aerating means in said first treating tank receives air, said first treating tank further includes heating means.

11. An apparatus as claimed in claim 10, wherein said first treating tank and said second treating tank are defined by separate vessels interconnected by a pipe having a valve and defining said connecting passage, said withdrawal path including pipes extending from said first treating tank and said second treating tank and joining each other.

* * * * *